United States Patent [19]

März

[11] Patent Number: 4,761,915
[45] Date of Patent: Aug. 9, 1988

[54] DOOR FOR AN AUTOMOTIVE VEHICLE
[75] Inventor: Helmut März, Lenting, Fed. Rep. of Germany
[73] Assignee: Audi AG, Ingolstadt, Fed. Rep. of Germany
[21] Appl. No.: 41,928
[22] Filed: Apr. 24, 1987
[30] Foreign Application Priority Data
 Apr. 25, 1986 [DE] Fed. Rep. of Germany ....... 3613978
[51] Int. Cl.$^4$ ............................................... B60J 5/04
[52] U.S. Cl. ........................................ 49/374; 49/502
[58] Field of Search ................. 49/374, 376, 377, 502, 49/348–352; 296/146

[56] References Cited
U.S. PATENT DOCUMENTS
4,089,134 5/1978 Koike ................................ 49/374 X Primary Examiner—Philip C. Kannan
Attorney, Agent, or Firm—Karl Hormann

[57] ABSTRACT

A door for an automotive vehicle provided with means for adjusting the position of a window frame or of a window pane relative to the door frame of a chassis by means which permit pivoting the frame or guide means of the window pane relative to the door frame.

16 Claims, 3 Drawing Sheets

DOOR FOR AN AUTOMOTIVE VEHICLE

BACKGROUND OF THE INVENTION

1. Field of the Invention

The invention relates generally to doors for automotive vehicles comprising an outer panel of sheet metal and a door frame including a support for components such as a window regulator for raising and lowering a window out of and into a chamber provided in the door. More particularly, the invention relates to such a door provided with novel means for aligning it, or at least part of it, relative to a door frame of an automotive chassis.

2. Description of the Prior Art

A door of this kind is generally disclosed by German Patent Specification No.: DE-OS 32 09 052. It is provided with a support for apparatus to be mounted inside of the door, such as a window regulator and a window pane. The regulator is mounted on a frame on the interior side of the door panel. The support means may be made of sheet metal stampings or of a suitable polymeric material.

There are basically two different types of automotive doors: On the one hand there are those provided with a window frame which in the closed condition of the door forms a seal with associated chassis structure, and on the other hand there are those doors in which a window pane is mounted for movement without such a frame. In the case of doors of this latter kind the entire arrangment for guiding a window pane may be mounted inside of the body of the door. That is to say, a window frame as well as a window guide may be mounted on a support in the manner disclosed in west German Patent Specification No.: DE-OS 34 12 356.

During the assembly of an automotive body a more or less complete or prefabricated door may be mounted to the chassis of a vehicle in an assembly line operation. Owing to ever-present smaller or greater deviations in the dimensions of the door or portions of the chassis, problems usually arise in respect of precisely fitting these components together. One of the requirements to be met is a precise fit between the window frame or, in the case of a frameless window, between the window pane and the chassis. In practice such a fit is usually brought about when the door is being mounted to the chassis by forcibly flexing the window frame into its final position to fit the chassis.

Such a practice suffers from a number of disadvantages. For instance, as a result of such forceful "fitting" precise guidance of the window pane may no longer be possible, and especially in the case of spherically shaped panes which move in precisely defined curves it may result in unwanted stresses and warping. The necessity of fitting the components relative to each other is time-consuming, and this increases the cost of the assembly operation. Since in the case of window panes guided without a frame the position of the support structure as a whole would have to be changed an adjustment after the door has been assembled may not be possible without taking the door apart and removing some of its internal components interfering with such an adjustment.

It is, therefore, a primary object of the invention to provide a novel automotive door which may easily be adjusted to fit the shape of a chassis into which it is to be mounted.

Another object of the invention is to provide an automotive door in which the position of a window frame may easily be adjusted to fit, or conform to, a chassis.

A further object of the invention is to provide an automotive door, including a frameless window the guide structure of which is located inside of the body of the door may easily be adjusted to fit the shape of a chassis.

Yet another object of the invention is to provide an automotive door which provides for easy adjustability of a window frame subseqent to the mounting of the door into a chassis.

Another object of the invention is to provide an automotive door provided with a frameless window which may be adjusted in its position relative to a chassis without necessitating dismantling of a door.

Other objects will in part be obvious and will in part appear hereinafter.

SUMMARY OF THE INVENTION

In the accomplishmnt of these and other objects, the invention, in preferred embodiments thereof provides for a novel automotive door comprising an exterior sheet metal panel and a door frame including support structure for supporting components in the interior of the door such as guides for a window mounted for movement in a chamber between the exterior door panel and the component support.

In one embodiment the window guide structure may be rigidly mounted on the component support with the support pivotably mounted on the door frame, and means accessible from the exterior of the door may be provided for adjusting the position of the component support relative to the door frame.

In another embodiment of the invention the window guide structure may be pivotably connected to the door frame, the component support being rigidly connected to the door frame, and means accessible from the exterior of the door may be provided for adjusting the position of the window guide structure relative to the component support.

The window guide structure may in one embodiment of the invention be a frame protruding from a recess between the exterior panel of the door and the door frame. In another embodiment of the invention the window guide structure may be a frame structure mounted in a vertical orientation inside of the door.

The adjustment means may be a threaded member accessible through an opening in the door and mating with another threaded member affixed to the component the position of which is to be adjusted. The connection between the threaded members may be spring biased by spring means seated between the components mounted for movement relative to each other.

DESCRIPTION OF THE DRAWINGS

The novel features considered characteristic of the present invention are set forth with particularity in the appended claims. The invention itself, however, in respect of its organization as well as its method of operation, together with other objects and advantages thereof, will be best understood from the following description of the preferred illustrative embodiments when read in conjunction with the accompanying drawings in which like numerals designate like elements and components, and in which:

FIG. 1 depicts, in a perspective view, a door 1 for an automotive vehicle (not shown). The door 1 comprises an outer panel 2 preferrably made of sheet metal and, connected therewith in spaced-apart superposed relationship, a door frame 3. On the side of the frame 3 opposite the outer panel 2, and facing the passenger cabin of the vehicle (not shown), there is also provided an interior panel or lining 4. A support member 6 for various components such as a window regulator, a door lock and so on, is provided within a chamber 5 located between the outer panel 2 and the inner panel 4. A window frame 7 for guiding a window pane is also connected to the support 6. The frame 7 may be inseparably connected to the support 6 by welding, for instance. For purposes of assembly, maintenance or repairs the support 6 may be provided with appropriately sized apertures 9, 10. Hinges 13 and a door handle 14 substantially complete the outer appearance of the vehicle door 1.

Figure 2:
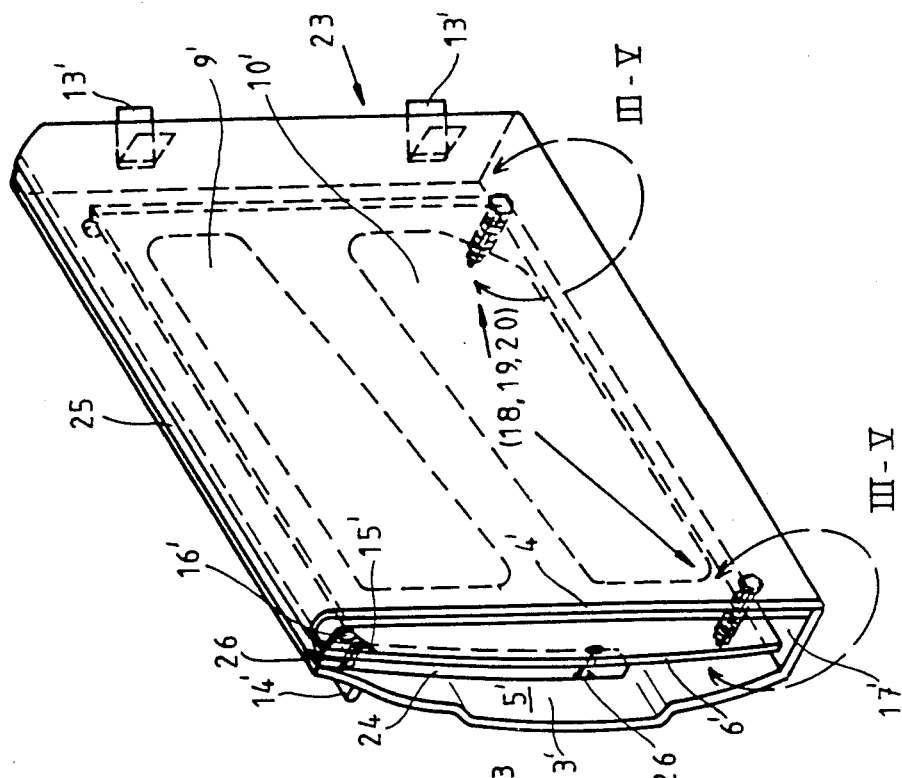
FIG. 2 is a perspective view of an automotive door provided with a frameless window guided by rail members provided in a chamber in the interior of the door.

Adjacent the hinges 13 and the door handle 14 the component support 6 is provided with brackets or ears 15 which together with threaded bolts 16 serve pivotably to connect the support 6 to the frame 3 of the door 1. Each of these pivotable connections is associated, or cooperates, with an adjustment mechanism 18, 19, 20 located near a lower section of the door 1. The position of the component support 6 or of the window frame 7 affixed thereto may be changed relative to the door frame 3 by means of the adjustment mechanisms 18, 19 or 20, so that aligning them relative to the dimensions of a door opening of a chassis (not shown) may easily be carried out. The adjustment mechanisms will be described in detail with reference to FIGS. 3, 4 and 5.

In the embodiments hereinafter described, structural elements similar to those of the embodiment described above will be referred to by similar reference numerals provided with an appropriate suffix.

Figure 1:
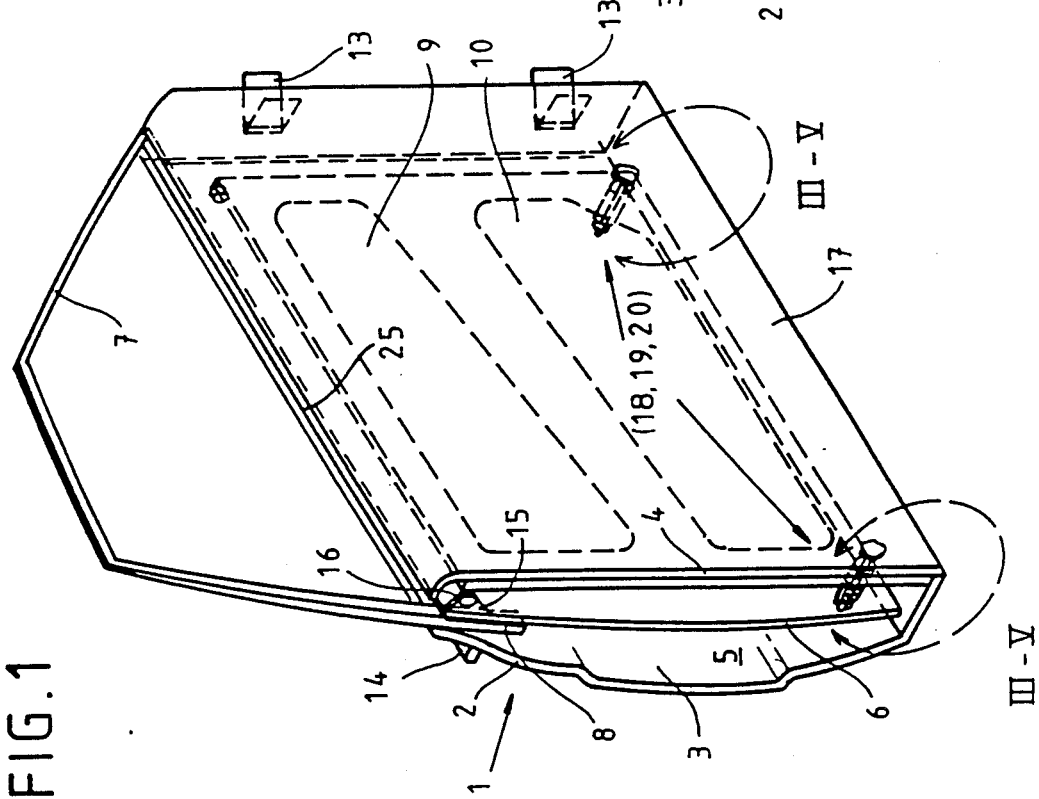
FIG. 1 is a perspective view of an automotive door provided with a window pane mounted for movement in a frame protruding from an upper portion of the door.

Reference is now made to FIG. 2 which depicts a door 23 of a structure substantially similar to that of the door 1. Instead of with a window frame 7, however, the door 23 is provided with a window guide 24 extending rather deeply into the chamber $5^1$ in a substantially vertical orientation to provide sufficient guidance for a window pane (not shown) which may extend without any frame through a slot 25 in the upper portion of the door 23. The window guides 24 may be somewhat curved to accommodate correspondingly curved marginal portions of the window. Adjacent the hinges $13^1$ and the door handle $14^1$ the window guides 24 may be pivotably connected to the component support $6^1$ by means of a hinged connection 26 similar to that shown in FIG. 1; but it will be appreciated that any other connection may instead be used.

The adjustment mechanisms 18, 19 and 20 used in door 23 for adjusting the position of the window guides 24 relative to the component support $6^1$ in two planes of movement will be described with reference to FIGS. 3, 4 and 5, respectively.

Figure 3:
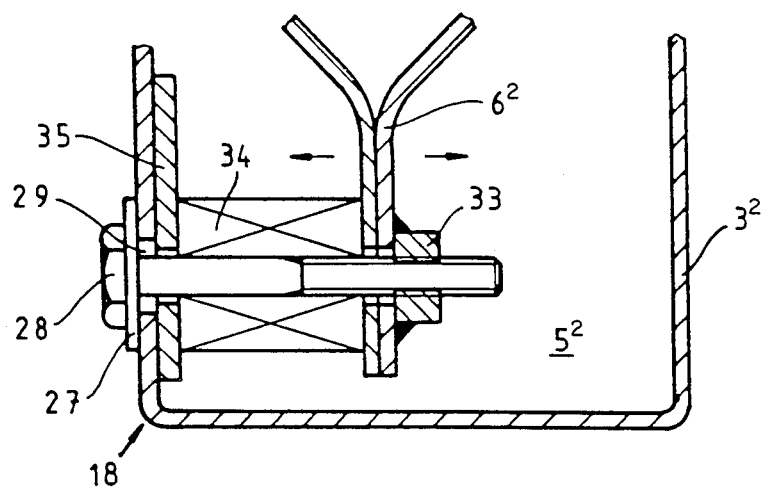
FIG. 3 is a cross-sectional view of a first embodiment of an adjustment mechanism cooperating with the component support inside of a door.

As shown in FIG. 3, the adjustment mechanism 18 comprises an adjustment screw 28 supported by a washer 27 penetrating through an aperture 29 in the door frame $3^2$ facing the passenger cabin (not shown) and into the chamber $5^2$. The adjustment screw 28 is threadedly received in a nut 33 welded onto the component support $6^2$. The threaded connection may be maintained under spring bias by a suitable spring, for instance a compound disk spring 34, seated between and pressing against the support $6^2$ and the frame $3^2$. The frame $3^2$ may be reinforced by a piece of sheet metal 35 against which one end of the spring 34 is seated.

The position of the component support $6^2$ to which the window frame 7 (FIG. 1) or the window guide 24 (FIG. 2) may be affixed may easily and at any time be changed by rotation of the adjustment screw 28. By appropriately selecting the characteristic curve of the compound disk spring 34 it is possible to provide for a defined pressure or bias of the window frame 7, or a window pane mounted in guides 24, against the door frame or seal of the chassis (not shown). For instance, the system may be such that it progressively counteracts lifting of the pane off the door frame by appropriately calibrated springs. Such lifting off might otherwise occur at higher driving speeds owing to prevailing pressure conditions.

Figure 4:
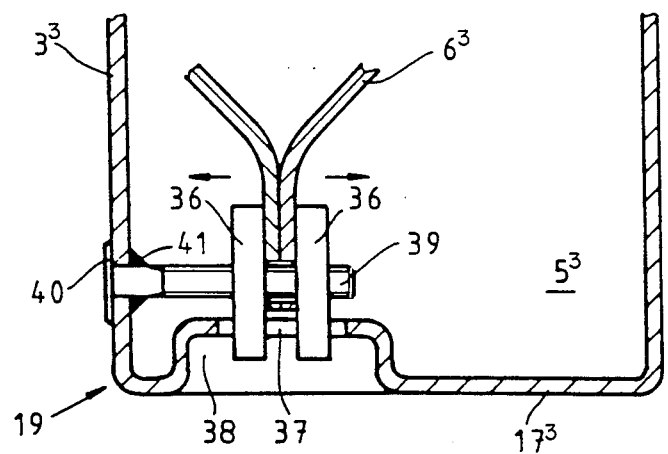
FIG. 4 is a cross-sectional view of a second embodiment of an adjustment mechanism having adjustment means accessible through the bottom of the door.

The adjustment mechanism 19 of FIG. 4 provides for adjustments by means of two nuts 36 preferably having knurled circumferential surfaces which at least partially protrude from an opening 37 in a bottom portion 17 of the door frame $3^3$. As shown, the bottom portion $17^3$, in the area of the nuts 36, comprises a recess 38 which effectively prevent the nuts 36 from protruding beyond the outer contour of the door 1 or 23 so that neither the visual appearance nor the functioning of the door 1, 23 during opening and closing is impaired.

The component support $6^3$ is seated between the knurled nuts 36. The nuts 36 are seated on a threaded shank 39 of a bolt the head of which may be welded to the door frame $3^3$ as shown at 41.

Figure 5:
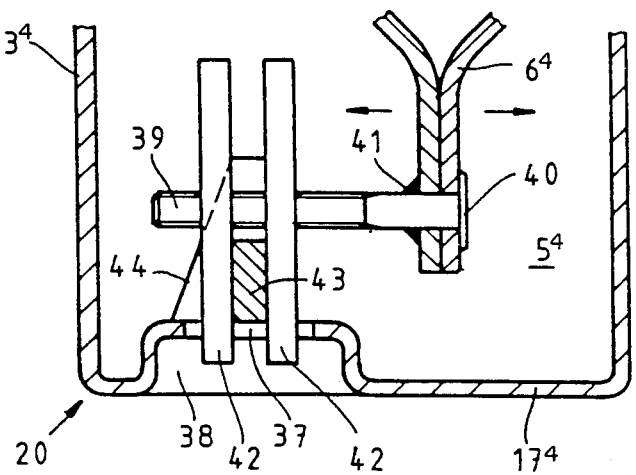
FIG. 5 is a cross-sectional view of a third embodiment of an adjustment mechanism in accordance with the invention.

A further adjustment mechanism 20 functioning in a manner somewhat similar to the embodiment of FIG. 4 is depicted in FIG. 5. Here, the head 40 of a threaded bolt $39^4$ is affixed to the component support $6^4$, and two manually actuable knurled nuts 42 are threaded onto the bolt $39^4$, and between them there is seated an abutment 43 a lap 44 of which is attached to the bottom portion $17^4$ in the area of the recess $38^4$.

Figure 6:
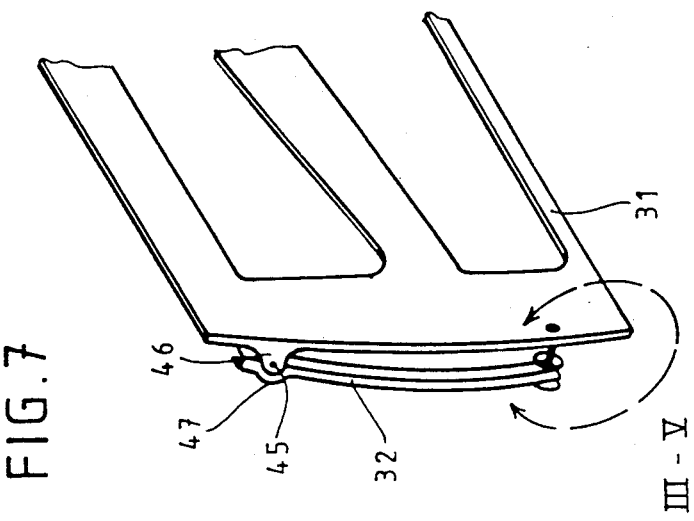
FIG. 6 is a perspective view, partially in section, of a component support and a window frame pivotably mounted thereon.
Figure 7:
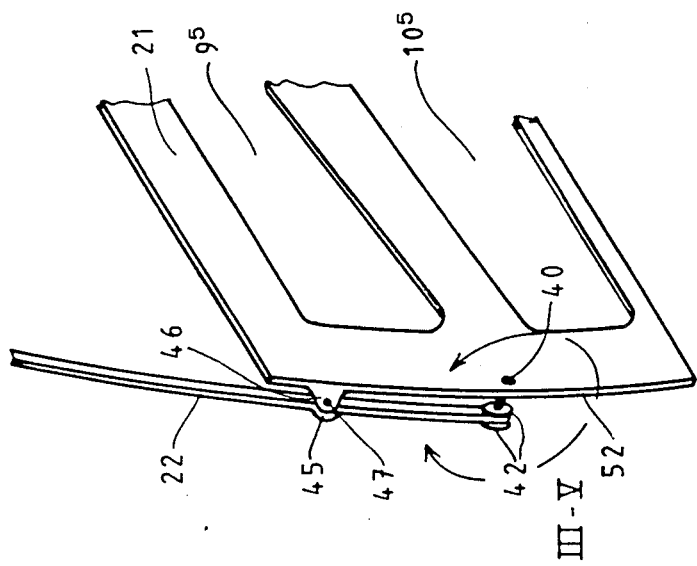
FIG. 7 is a perspective view, partially in section, of a component support and a frameless window guide pivotably mounted thereon.

FIGS. 6 and 7 disclose structures which offer another way of accomplishing the objects of the invention. FIG. 6 depicts a component support 21 which may be affixed to the door frame (not shown), and a window frame 22 is pivotably connected to the support 21 by means of threaded bolts 47 extending through complementing brackets 45, 46. An adjustment mechanism 18, 19 or 20 of the kind described hereinabove may be provided at the lower end of the frame 22. The frame 22 may, for instance, be seated between two adjustment nuts $42^5$ threadedly seated on the shank $39^5$ of a bolt the head $40^5$ threadedly seated on the shank $39^5$ of a bolt the head $40^5$ of which may be welded to the component support 21. The arrangement will be recognized as being comparable to the structure of FIG. 5. The function of this arrangement corresponds in principle to any one of those described in connection with FIGS. 3-5. The adjustment nuts $42^5$ may protrude somewhat beyond a vertical edge 52 of the support 21 and through an opening in a recess in an edge portion of a door (not shown). Hence, the nuts $42^5$ may be easily accessed for adjusting the position of the window frame 22 relative to the component support 21. It will, of course be appreciated that a similar adjustment mechanism may be provided at the opposite end of the component support 21.

The embodiment depicted in FIG. 7 is similar to that of FIG. 6 but is for use with a vehicle door having no window frame. Instead of with a window frame 22, it is provided with window guides 32 (only one shown) pivotably connected to the component support 31 at opposite ends thereof and provided near their lower extremity with adjustment mechanisms 18, 19 or 20 of the kind described above. The functioning of this arrangement is similar to that described in connection with the arrangement of FIG. 6 so that it is deemed not to be necessary to describe it again. Suffice it to say that two adjustment mechanisms 18, 19 or 20 as well as two pivotable connections are provided, one in the vicinity of the door hinges, the other near the door handle.

While there has been described what at present are considered preferred embodiments of the invention, it will be obvious to those skilled in the art that various changes and modifications may be made without departing from the invention. The invention may thus embrace other structures functioning in a manner resulting in relative movement between the component support and the door frame or between the component support and the window frame or window guide, even in a preassembled door. For instance, it would be within the scope of the invention to provide the pivotable connection near the lower portion of the door and the adjustment mechanisms at the upper portion of the door.

What is claimed is:

1. A door for use in a vehicle, comprising:
   a panel member;
   a frame member positioned in spaced-apart superposed relationship to said panel member to provide a chamber for receiving a window pane mounted for movement into and out of said chamber substantially along a first axis;
   component support means positioned in said chamber;
   guide means for providing guidance to said window pane during said movement;
   means for connecting said component support means to one of said frame member and said guide means for pivotable movement relative to the other of said frame member and said guide means about a second axis intersecting said first axis;
   means for pivoting said component support means about said second axis into a predetermined position relative to said one of said frame member and said guide means; and
   means for maintaining said predetermined position between said component support means and said one of said frame member and said guide means.

2. The door of claim 1, wherein said guide means comprises a window frame rigidly connected to said component support means and extending out of said chamber.

3. The door of claim 2, wherein said pivoting means is provided at a position parallel of said first axis.

4. The door of claim 3, wherein said maintaining means comprises a threaded connection extending along a third axis substantially orthogonal to said first and second axes and comprising a first member mounted on one of said component support means and said frame member and a second member threadedly connected to the other of said component support means and said frame member, said first and second members being rotatable relative to each other.

5. The door of claim 4, wherein said maintaining means is provided at a position below said pivoting means.

6. The door of claim 5, wherein one of said first and second members is axially accessible for rotation through an opening in said door.

7. The door of claim 5, wherein one of said first and second members is at least one nut radially accessible for rotation through an opening in said door.

8. The door of claim 4, wherein said maintaining means is provided with means for biasing said component support means and said frame member in opposite directions.

9. The door of claim 8, wherein said biasing means comprises expansion spring means.

10. The door of claim 9, wherein said spring means comprises disk spring means.

11. The door of claim 1, wherein said guide means comprises rail means mounted in said chamber and extending substantially parallel to said first axis.

12. The door of claim 11, wherein said pivoting means is provided at a position parallel to said first axis.

13. The door of claim 12, wherein said maintaining means comprises a threaded connection extending along a third axis substantially orthogonal to said first and second axes and comprising a first member mounted on one of said component support means and said guide means and a second member threadedly connected to the other of said component support means and said guide means, said first and second members being rotatable relative to each other.

14. The door of claim 13, wherein maintaining means is provided at a position below said pivoting means.

15. The door of claim 14, wherein one of said first and second members is axially accessible for rotation.

16. The door of claim 14, wherein one of said first and second members is at least one nut radially accessible for rotation through an opening in said door.

* * * * *